SIGNAL CONVERTER FOR COMMUNICATION SYSTEMS

Filed Nov. 24, 1954 2 Sheets-Sheet 1

INVENTORS W. W. FRITSCHI
A. WEAVER

BY John E. Cassidy

ATTORNEY

INVENTORS W. W. FRITSCHI
A. WEAVER
BY John E. Cassidy
ATTORNEY

United States Patent Office 2,765,371

Patented Oct. 2, 1956

2,765,371

SIGNAL CONVERTER FOR COMMUNICATION SYSTEMS

Walter W. Fritschi, Bayside, and Allan Weaver, Port Washington, N. Y., assignors to Bell Telephone Laboratories, Incorporated, New York, N. Y., a corporation of New York Application November 24, 1954, Serial No. 470,996

6 Claims. (Cl. 179—84)

This invention relates to signaling systems incorporated in communication systems and more particularly to a supervisory signal converter wherein direct-current supervisory signals received from a trunk relay circuit connected to one end of the converter are converted into voice frequency alternating-current supervisory signals which are transmitted over a communication channel to a distant station. At the distant station the voice frequency alternating-current supervisory signals are passed through another converter where they are reconverted to direct-current signals which are then passed on through a relay trunk circuit. In transmitting in the opposite direction corresponding conversions are effected. For transmitting in the two directions a converter is required at each station. Each converter comprises a transmitting channel and a receiving channel. The frequencies of the alternating currents transmitted between the stations differ one from the other.

A system generally corresponding to the present system is well known in the art. It is described, for instance, in Patent 2,642,500, granted to W. W. Fritschi and R. O. Soffel, June 16, 1953, which is hereby incorporated by reference as though fully set forth herein. Patent 2,642,500 discloses a complete system comprising a relay trunk circuit connected through a converter, such as the present converter, at a first station to either a two-wire or a four-wire line extending to a distant station where the circuit extends through another such converter to another relay trunk circuit. The present arrangement discloses the converter only, one of which is located at each of the two interconnected stations. The present converter comprises a number of improvements over the converter disclosed in Patent 2,642,500.

In the present system, as in the system described in Patent 2,642,500, the direct-current supervisory signals received from the relay trunk circuit at the first station are converted into voice frequency alternating-current signals of a first frequency, which may be for instance 2400 cycles, which are transmitted over the connecting channel to the remote second station where they are reconverted into direct-current signals which are applied to the relay trunk circuit at the second station. In transmitting in the opposite direction direct-current supervisory signals produced in the distant relay trunk circuit are converted in the converter at the distant station into voice frequency alternating-current signals of a different frequency, which may be for instance 2600 cycles. These 2600-cycle signals are transmitted over the channel from the second station to the first station. They are reconverted in the converter at the first station into direct-current signals which are then applied to the relay trunk circuit at the first station. Except for necessary modifications in the converter, to transmit 2400-cycle signals and to receive 2600 cycles in the first converter, and to transmit 2600-cycle signals and to receive 2400-cycle signals in the second converter the converters at each station are identical. It is considered, therefore, that the operation of the system may be understood from a detailed description of one of the converters only.

With respect to a single converter only at one end of the system, the functions performed by the present converter are as follows:

The converter transforms direct-current supervisory signals received from an associated trunk relay circuit into a supervisory tone signal suitable for transmission over the voice path of a toll trunk, either carrier or voice frequency.

The converter recognizes this presence or absence of incoming alternating-current supervisory tone from the distant station and repeats this information in the form of direct-current on-off signals to the associated relay trunk circuit.

The converter provides a narrow band-elimination filter at the incoming supervisory tone frequency in the receiving voice path under control of the incoming signal. Tone signals are thus localized to a single link on tandem connections.

The converter provides a narrow band-elimination filter at the outgoing supervisory tone frequency in the receiving voice and signaling path under control of outgoing signals. Its function is to prevent interference with incoming signals from reflected alternating-current outgoing supervisory signals transmitted from the same station.

The converter prevents interference with the incoming supervisory signals which would be caused by untimely speech, ringing or noise voltages produced at the same station where the signals are being received.

The converter effectively cuts off all transmission outgoing from the connected trunk circuit and simultaneously raises the transmission level of the supervisory signal tone produced in the converter and applied to the outgoing signal path, each time an outgoing supervisory signal is applied to the path extending to the distant station.

The converter provides a means of discriminating between supervisory signaling tone of cycles and components in speech signals simulating this tone.

The converter provides supervisory signal-sensing means which prevent the operation of the supervisory signal control in response to signals of short duration, occurring during the reception of speech, which simulate supervisory signals, by delaying response to such simulating signals and in order to compensate for the delay lengthens the duration of signals which are in fact supervisory signals.

It is to be understood that a second converter, at the second station at the opposite end of a line section, performs corresponding functions except that it is assumed that it transmits alternating-current supervisory signals of a different frequency and receives alternating-current supervisory signals of the frequency transmitted from the first station.

This invention may be understood from reference to the associated drawings which disclose a preferred embodiment in which the invention is presently incorporated. It is to be understood, however, that the invention may be incorporated in other embodiments.

Referring to the drawings.

*General description*

Before proceeding with the detailed description of the invention, the converter will first be described in a general way as an aid to understanding the detailed description of the invention hereinafter. It is to be understood that the magnitudes of constants cited in the application are by way of example and are not to be considered as limitations.

Figure 1:
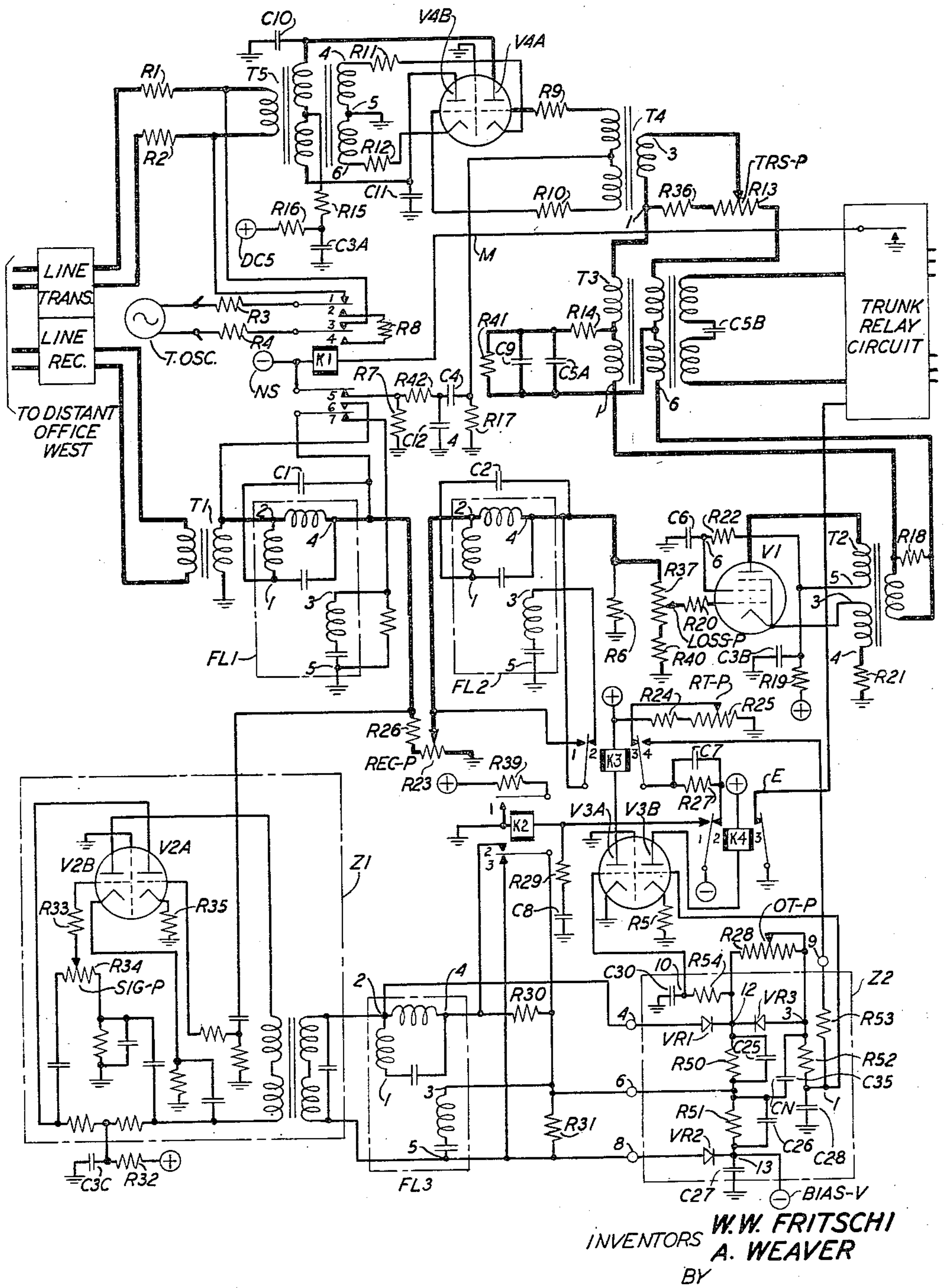
Fig. 1 shows the signal converter of the present invention.

The converter of the present invention is primarily intended for application in a so-called toll trunk system interconnecting toll telephone offices in telephone communication. In such systems, as is well understood, the connection may at times be a single communicating link interconnecting two toll offices only. Frequently, the system comprises a number of toll offices connected in tandem. As mentioned in the foregoing, each interconnecting link between two toll offices will comprise a relay trunk circuit and a signal converter at each of the stations. In Fig. 1 the trunk relay circuit is identified by a captioned rectangle shown at the upper right of the figure. The details of the trunk relay circuit are not shown but it is to be understood that they are identical with those of the trunk relay circuit shown in Fig. 1 or Fig. 5 of Patent 2,642,500. It is to be understood also that the trunk relay circuit may take other forms. In general the trunk relay circuit comprises a communication path and supervisory signal controls. The trunk relay circuit, as shown in Patent 2,642,500, may be terminated in jacks which afford means for extension to other circuits, which circuits may be local or long distance, by means, for instance, of telephone cord or mechanical selector circuits.

The two-wire speech communication path extending between the trunk relay circuit and the converter circuit is connected to hybrid coil T3 and the speech transmitting path is extended through hybrid coil T3 to the transmitting and receiving branches of the converter. In the converter, the transmitting path extends through transformer T4 and the double triode amplifier V4A and V4B to transformer T5 which connects to the line Line Trans which extends to the distant office. The facility interconnecting the two offices may be a four-wire or two-wire path as shown in Fig. 3A and Fig. 3B, respectively, of Patent 2,642,500. Connectable to the transmitting path under control of relay K1 is the supervisory signal tone transmitting oscillator T.OSC., which in the present circuit is assumed to generate 2400-cycle supervisory signal tone. It will be observed that the tone oscillator is connected to the transmitting path Line Trans at a point beyond the speech signal amplifiers V4A and V4B.

The direct-current supervisory signal path, incoming from the trunk relay circuit is brought into the converter from a relay contact in the trunk relay circuit over lead M and through the winding of relay K1 to battery. Thus relay K1 is controlled by a supervisory relay in the trunk relay circuit in a manner described in Patent 2,642,500.

The combined speech signal and supervisory signal path incoming from the distant office extends through the receiving line Line Rec to transformer T1 and through filter FL1. On the incoming side of this point, there are two separate paths, one for the incoming supervisory signals and one for the speech signals. The incoming alternating-current supervisory signals are directed through an alternating-current amplifier circuit Z1, filter FL3, rectifier circuit Z2, amplifiers V3A and V3B, a relay control system, comprising relays K2, K3 and K4 and the direct-current supervisory relay control circuit comprising conductor L which extends into the trunk relay circuit where it controls a relay as described in Patent 2,642,500.

To the right of filter FL1 the speech signal receiving path per se extends through a shunt around filter FL2, since relay K3 is normally released, in a manner to be described, during the reception of speech signals, then through amplifier V1, transformer T2 and hybrid coil T3 to the trunk relay circuit. A portion of the speech signals, during the reception of speech, is directed through the supervisory signal receiving portion of the circuit to thereby produce a bias against its false operation due to the reception of signals which simulate supervisory signals while speech signals are being received.

It is to be understood, as mentioned previously, that a converter corresponding to the converter, shown in full in Fig. 1, and a trunk relay circuit, such as indicated by the captioned rectangle shown in Fig. 1, are located at the remote station. The speech and supervisory signals transmitted through the transmitting path at the top of Fig. 1 will be received at the distant station in a receiving circuit corresponding to the receiving circuit at the bottom of Fig. 1. The signals transmitted through the transmitting path, corresponding to that at the top in the present Fig. 1, in the converter at the distant station, are those which are received in the receiving path in the lower portion of the present Fig. 1. The 2400-cycle supervisory tone signals assumed to be transmitted from the first station will be impressed on the remote receiver. The 2600-cycle supervisory tone signals assumed to be generated by the remote tone transmitting oscillator will pass through the transmitting path of the remote converter and will be impressed on the receiving branch of the converter at station 1.

*Detailed description*

The hybrid coil T3 and its comprise balancing network consisting of resistors R14 and R41 and capacitors C9 and C5A are designed to provide a trans-hybrid loss of thirty decibels between the four-wire branches when the two-wire trunk connection is extended through the trunk relay equipment to another line in tandem which line is equipped with another signal converter such as that shown in Fig. 1. When the system involves a connection with a line which is terminated at the switchboard instead of being connected in tandem to a more remote switchboard somewhat less trans-hybrid loss may be realized.

Double triode V4A and V4B and its associated apparatus is a multipurpose amplifier. This amplifier provides sufficient gain so that the transmission level at the point designated Line Trans is −4 decibels when the level of the signals incoming from the two-wire trunk is zero decibels referred to one milliwatt. The potentiometer TRS–P, comprising resistors R13 and R36 and the associated movable contact, affords an over-all adjustment to four-decibel loss from the two-wire connection of the hybrid coil to the Line Trans. Windings 4, 5 and 5, 6 of the transformer T5 are provided to afford sufficient negative feedback to permit replacing the double triode V4A and V4B without excessive gain variation. With this arrangement, gain resulting from replacement of the double triode is limited to ±0.2 decibel. The input impedance at the 1–3 winding of the T4 input transformer is relatively high compared to the 600-ohm termination of the hybrid coil T3 which is provided by resistors R36 and R13 in series. This is accomplished by the high primary inductance of transformer T4 and the grid-limiting resistors R9 and R10. Response is uniform over the speech band of 300 cycles per second to 3000 cycles per second to within ±.25 decibel. Raising the input level to +10 decibels referred to one milliwatt does not produce compression in excess of 0.5 decibel.

The remaining associated resistors and capacitances of this amplifier with the exception of resistor R17 have the following functions:

Resistors R11 and R12 provide a self-biasing feature. Capacitance C3A and resistor R16 provide plate circuit decoupling from the common high-voltage direct-current supply DC5. Capacitors C10 and C11 limit out-of-band gain to avoid spurious high-frequency oscillations. Resistor R15 is employed as a voltage-dropping resistor to obtain a direct-current vacuum tube plate potential of approximately 60 volts. The grid path through resistor R17 normally holds the grids of the double triode V4A and V4B at ground potential provided that relay K1 has been at rest for an interval of time either in the operated or non-operated position. Under this condition double triode V4A and V4B functions as an amplifier with an output impedance of 250 ohms. When ground is applied to supervisory signal control conductor M, by the operation of a relay in the trunk relay circuit, relay K1 is operated and a charge stored in capacitance C4 discharges through resistors R17 and R7, causing a momentary positive potential drop across resistor R17. This biases the amplifier into a positive grid non-amplifying condition. Similarly, when the charge on capacitance C4 has been completely dissipated and double triodes V4A and V4B are again amplifying, the release of relay K1, by the removal of ground from conductor M in the trunk relay circuit, permits capacitor C4 to recharge from negative battery through contact 5 of relay K1, capacitance C4 and resistor R17, causing a momentary negative potential drop across resistor R17. During this interval, until capacitor C4 is again charged, the double triodes V4A and V4B become non-amplifying since their grids are biased to negative cut-off or beyond. The object of applying ground from the trunk relay circuit to the winding of relay K1 is to operate the relay to transmit a supervisory signal to the distant station. The object of cutting off the V4A and the V4B double triodes at such time is to increase their impedance and to thereby increase momentarily the amplitude of the 2400-cycle signal which is being transmitted as a supervisory signal to the distant station. This condition will continue as long as double triodes V4A and V4B remain cut off.

Figure 2A:
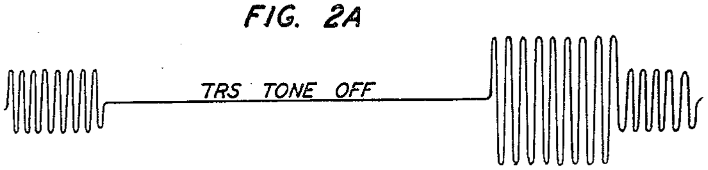
Figs. 2A, 2B and 2C are diagrams used in explaining the invention.
Figure 2B:
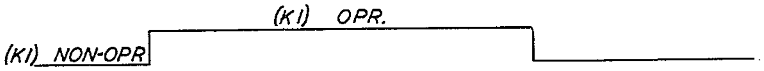
Figure 2C:
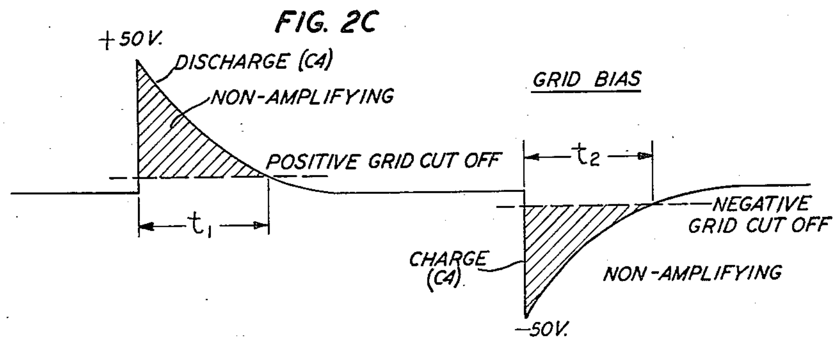

This gating action is shown diagrammaticaly in Figs. 2A, 2B and 2C. While the circuit is idle, the supervisory signal transmitting oscillator T.OSC. is normally connected to the transmitting line through resistors R3 and R4, contacts 1 and 3 of relay K1 and resistors R1 and R2, respectively. Normally, while the impedance of the circuit looking into transformer T5 from the transmitting line is low and while relay K1 is released, as indicated at the left in Fig. 2B, the amplitude of the transmitted supervisory tone signals is small as indicated at the left in Fig. 2A. When relay K1 is operated, as indicated in the middle portion of Fig. 2B, the transmitting oscillator T.OSC. is cut off from the transmitting line and no 2400-cycle supervisory signal tone is transmitted as indicated in the middle portion of Fig. 2A. At the start of this interval, as explained in the foregoing, the double triodes V4A and V4B are cut off due to the excessive positive potential applied to their grids as indicated at the left in Fig. 2C. When relay K1 is released, as indicated at the right in Fig. 2B, and double triodes V4A and V4B are again cut off, due to the excessive negative potential applied to their grids, as indicated at the right in Fig. 2C and, while the impedance of double triodes V4A and V4B is, therefore, increased, the amplitude of the 2400-cycle supervisory signals transmitted to the distant station is very materially increased as indicated at the right in Fig. 2A. As the negative charge on capacitor C4 is dissipated and the grid bias of these triodes becomes less negative and until these triodes again conduct, the amplitude of the transmitted signal remains at its higher level. At the end of the negative cut-off interval, the amplitude of the transmitted 2400-cycle supervisory signal will return to its normal level, as indicated at the extreme right in Fig. 2A. This is one of the important features of the present invention and represents a substantial improvement over the arrangement of the prior art, as illustrated in Patent 2,642,500. The advantage obtained by the gating arrangement is, that while the circuit toward the switchboard to the right through the trunk relay circuit is cut off, while double triodes V4A and V4B are disabled, there can be no possible interference due to speech or noise from this side of the circuit with the reception of the 2400-cycle tone supervisory signals at the distant switchboard during the establishment of a call. The level of the 2400-cycle tone supervisory signals is increased by about 12 decibels for the time interval T2 shown in Fig. 2C. The duration of this interval may be established to suit conditions by a choice of constants of the capacitor-resistor control. The signal-to-noise ratio, it will be observed, is very substantially raised during this interval when this ratio is most important. The interval may, for instance, be approximately 200 milliseconds.

Resistor R7 has negligible effect on the gating action since it is selected to have substantially smaller magnitude than resistor R17. It serves to clamp capacitor C4 to negative battery or to ground under control of contact 5 of relay K1. Resistor R7 also functions to maintain approximately constant current drain from the negative direct-current source NS. It replaces the current drain of relay K1. Double triode amplifier V4A and V4B is a double-sided push-pull type and has bridge-type feedback to minimize the effect of the gating transients. Resitsor R42 and capacitor C12 function to attenuate rectifier ripple from the direct-current source. This ripple would otherwise appear with signal tone at Line Trans due to amplification in amplifiers V4A and V4B.

Attention is called to the fact that the 2400-cycle signal tone supplied by the transmitting oscillator T. OSC. is normally connected to the line during the idle period as relay K1 is normally released. The level of this tone during the idle period, indicated at the left in Fig. 2A and at the extreme right in Fig. 2A, is 15 decibels below transmission level or −19 decibels referred to one milliwatt at the −4 decibel transmission level point Line Trans. These levels are based upon a line impedance of 600 ohms and a steady state amplifier output impedance of 250 ohms. The momentary higher level during the approximately 200 milliseconds after relay K1 is released is therefore normally −7 decibels referred to one milliwatt at the same point. Resistor R1 and resistor R2 are chosen to provide approximately a 600-ohm line termination and are instrumental in obtaining the 12-decibel level increse during the 200-millisecond interval while triodes V4A and V4B are non-amplifying. Resistor R3 and resistor R4 are provided as voltage-dropping resistors so as to obtain the desired signal levels from a single signal tone oscillator which serves a number of trunks in common and which may have a normal 2.3-volt output, for instance. Resistor R8, which is connected through contacts 2 and 4 of relay K1 across the output of the transmitting oscillator T.OSC., is a load equalizing resistor which minimizes oscillator output voltage variation due to load changes on the common oscillator. The spurs to the right of the oscillator T.OSC. indicate that the oscillator is connected in common to a number of signal converters, such as that shown in Fig. 1. Resistor R8 is equivalent to the combination of the impedance of the line and the impedance of the V4A and V4B amplifier when the latter is in the amplifying condition. At the beginning and end of each tone signal the effective line termination at Line Trans will momentarily increase to 3600 ohms or more, for instance, during the non-amplifying intervals T1 and T2 shown in Fig. 2C. Relay K1 also controls a band elimination filter FL1 in the receiving portion of the circuit. This will be described in detail hereinafter.

The receiving portion of the four-wire transmission path incoming from the line from the distant station through Line Rec is terminated in approximately 600 ohms by the input impedance of the step-up transformer T1. The transformer T1 converts the balanced-to-ground line input to an input circuit grounded on one side for simplification of the networks FL1 and FL2 as well as their control circuits, and the coupling to the grids of the receiving amplifier V1 and to the preamplifier V2A of the signal receiver.

The 2400-cycle supervisory tone signals transmitted from the transmitting oscillator T.OSC., as explained, are directed to the distant station assumed to be located toward the left of Fig. 1. However, a certain amount of this 2400-cycle tone is reflected from the distant station or intermediate amplifiers and appears at the terminals of Line Rec. The function of network FL1 is to attenuate these reflections. Network FL1 is therefore inserted in the receiving transmission path by relay K1 whenever that relay releases to apply outgoing supervisory signal tone to Line Trans.

It is emphasized that, in the present arrangement, low-level 2400-cycle tone is applied from the transmitting oscillator T.OSC. whenever the system is idle. The amplitude of the tone is increased when the supervisory signal is actually transmitted and it is completely removed from the circuit while the circuit is in condition to transmit speech at which time relay K1 will always be operated. While the system is in the speech transmitting condition and relay K1 is operated, its contact 6 is closed and band elimination filter FL1 is short-circuited through contact 6 of relay K1. During this interval filter FL1 is effectively out of circuit and obviously performs no function. When relay K1 is reelased, filter FL1 is effectively connected in the receiving circuit and is arranged as an antiresonant network 1—2—4 in series with a resonant network 3—5 through contact 7 of relay K1. The nominal mid-band frequency of filter FL1 is always that of the outgoing signal. In this case, since it is assumed that the frequency of the transmitting oscillator T.OSC. is 2400 cycles, the mid-band frequency of filter FL1 is also 2400 cycles, since its function, as explained, is to attenuate reflections of the supervisory signal tone transmitted from the same station where filter FL1 is assumed to be located. It is to be understood of course that at the distant station, where it is assumed the transmitted supervisory signal tone is 2600 cycles, the mid-band frequency of the filter at that station corresponding to filter FL1 will be 2600 cycles. Filter FL1 will therefore effectively prevent the transmission of the reflected 2400-cycle supervisory signal tone to that portion of the circuit to the right of filter FL1 while filter FL1 is effectively connected in circuit. Since, during the period while the circuit is arranged for talking, relay K1 is operated and its contact 6 is closed, filter FL1 is effectively disconnected and will not interfere with the reception of speech signals.

Filter FL2 is a band elimination filter similar to filter FL1 except that it has a nominal mid-band frequency of 2600 cycles corresponding to the frequency of the supervisory signal tone transmitted from the distant station. Its purpose is to suppress the supervisory tone signals transmitted from the distant station so as to prevent their transmission into the speech receiving portion of the circuit to the right of filter FL2. Filter FL2, like filter FL1, comprises an antiresonant network 1—2—4 and a resonant network 3—5 connected in series. This filter is under control of the supervisory signal tone received from the distant station to which relay K3 is responsive in a manner to be described. When relay K3 is operated, which is the condition indicated on the drawing, the two sections of filter FL2 are connected in series, effectively preventing the transmission of supervisory signal tone generated at the distant station into the speech receiving portion of the circuit beyond the output of filter FL2 or through the associated trunk circuit to another connected trunk in tandem. When the circuit is conditioned for the reception of speech signals, relay K3 will be released, in a manner to be described, and filter FL2 will be short-circuited through a branch which extends through contact 1 of relay K3.

It will be observed therefore that, since filter FL1 substantially eliminates the reflected 2400-cycle supervisory signal tone transmitted from the same station where filter FL1 is located, effectively preventing its transmission to either the speech receiving portion or the supervisory signal receiving portion of the circuit, and since filter FL2 substantially eliminates the 2600-cycle supervisory signal tone trasmitted from the distant station, from the speech receiving branch of the circuit to the right of filter FL2, all supervisory signaling tones are eliminated from the speech receiving portion of the circuit on the switchboard side of filter FL2, and only the 2600-cycle supervisory signal tone transmitted from the next preceding distant station is directed into the supervisory signal tone receiving portion of the circuit. This is shown at the bottom of Fig. 1. This tone does not again get into the speech transmitting portion of the circuit. Thus all supervisory signal tone, including reflected tone, transmitted from one station to the next succeeding station in a tandem connection involving a succession of line sections and switchboards is limited to a single link in the tandem connection. This is of considerable importance on built-up connections of several trunks in tandem.

While speech signals are being received, as heretofore mentioned, relay K3, which is operated, in a manner to be explained, only during the reception of the 2600-cycle supervisory signal tone transmitted from the distant station, will be released and since relay K1 is also released the speech signals will pass without obstruction directly from transformer T1 to the receiving potentiometer REC–P and the loss adjustment potentiometer LOSS–P, and will be applied to the input of speech signal receiving amplifier V1. Amplifier V1 is of the conventional single-sided feedback type. Sufficient feedback is provided in the circuit associated with receiving amplifier V1 so that tube changes will not materially affect output level. Potentiometer REC–P is provided so that the circuit may be adjusted at the fractory to provide an over-all loss from the Line Rec terminals to the trunk relay terminals of four decibels when potentiometer LOSS–P is set at "0" loss. Under these conditions a nominal net trunk transmission loss of three decibels is obtained between switchboards. Potentiometer LOSS–P provides a convenient means of increasing this net transmission loss in steps of one decibel when, for transmission reasons, it appears desirable to do so. Approximately 10 decibels additional loss may be inserted by this means. The output transformer T2 in combination with the shunt resistor R18 completes the receiving side of the four-wire transmission path to hybrid coil T3 and provide the desired 600-ohm termination on terminals 1—6 of hybrid coil T3. Amplifier V1 is self-biased by the flow of cathode current through resistor R21 and the direct-current resistance of the feedback winding 3—4 of transformer T2. Plate voltage terminal 5 of transformer T2 and screen voltage terminal 6 of amplifier V1 are decoupled from the common direct-current voltage supply by the combinations of resistor R19 and capacitor C3B, and resistor R22 and capacitor C6, respectively. Resistor R20 prevents excessive grid current flow at high input levels and tends to limit alternating-current output voltage by peak-chopping at these levels.

Attention will now be directed to the supervisory signal tone receiving portion of the circuit which includes the double triode vacuum tubes V2A and V2B, and V3A and V3B together with their associated apparatus and the three control relays K2, K3 and K4. Essentially, this portion of the circuit comprises an input circuit, a frequency selective pair of diode rectifiers and impulse storage circuits, a pair of direct-current amplifiers and the control relays.

The input circuit is a two-stage twin-triode amplifier Z1 designed primarily to provide adequate sensitivity to incoming alternating-current voltages in the frequency range from 300 to 3000 cycles. Outside this band of frequencies, response drops off rapidly due to the choice of the values of input and interstage capacitive coupling and due to an increased amount of negative feedback at frequencies below 300 cycles per second. Above 3000 cycles per second the capacitive output shunt aids in attenuating high-frequency response.

The high direct-current resistances in the grid and plate circuits of triodes V2A and V2B provide a limiting action which is beneficial in discriminating between signal and speech frequencies.

Direct-current plate voltage is supplied through resistor R32 which in conjunction with capacitor C3C acts as a decoupling filter for small alternating-current voltages which may appear in the common power supply unit.

The output of the alternating-current amplifier Z1 is connected to filter FL3 and rectifier Z2. The filter provides two degrees of frequency selectivity dependent upon the condition of the K2 relay. The diode rectifiers VR1 and VR2 rectify the alternating-current voltage developed across the filter terminals. The filter FL3 consists of an antiresonant portion, terminals 1—2—4 and a series resonant portion, terminals 3—5. Each section is tuned to the same nominal frequency. In this particular case, since it is assumed that the supervisory signal tone transmitted from the distant station is 2600 cycles, the filter will be tuned to 2600 cycles. Filters FL3, FL1 and FL2 are essentially the same. When used in the supervisory signal receiving portion of the circuit the output impedance of amplifier Z1 and shunt rectifiers Z2 introduce a capacitive reactance shunt on the filter which causes a slight amount of detuning. The antiresonant portion of filter FL3 is therefore tuned to a frequency slightly above nominal so that the in-circuit frequency of filter FL3 will be close to the nominal midband frequency. Thus when the same filter is used as filter FL1 or filter FL2, an external shunting capacitance C1 or C2 is added to obtain the nominal mid-band frequency for these applications. Two basic networks, one for each signaling frequency, thus suffice for all filter applications.

In this tone signaling system, as previously mentioned, tone remains on the line during idle periods. It is removed when the circuit is appropriated for use, which condition is termed an off-hook signal. Tone is reconnected on a disconnection as an on-hook signal. It has been well established that careful design is required to obtain a high degree of immunity to speech generated signal frequency during the talking interval to avoid false on-hook signals. Freedom from false operation on speech is, to a large degree, due to the high selective characteristic of the FL3 network when the K2 relay is operated, in a manner to be described. On the other hand during idle periods this high selective circuit would produce false connection signals upon momentary noise bursts or changes in signal level. The release of the K2 relay therefore controls filter FL3 to broaden the frequency band to which the receiver will respond. In this way a noise burst, although it may momentarily overpower signaling tone, will itself hold the receiver operated during the noisy interval.

The need for this change in selectivity may be more readily appreciated with a better understanding of the details of the means employed to discriminate between speech and signal tones during the talking interval during which the K2 relay is operated. This may conveniently be referred to as the "guard-in" condition since the circuit is designed to cause any frequencies outside the narrow band within 100 cycles of the normal signaling frequency to produce a bias against operation which any signaling frequency present would be required to overcome before the supervisory signal receiver will operate. The separation of the frequency content of the Z1 amplifier output into two voltages, one voltage proportional in magnitude to the amount of signal frequency present and the other voltage proportional in magnitude to the amount of the frequencies other than the signal frequency present, is effected by the tandem connection of the antiresonant section 1—2—4 and the series-resonant section 3—5 of filter FL3 across the amplifier output. Relay K2 when operated short-circuits resistor R30, effectively removing it from the circuit. It also, at this time, removes a short circuit from the series-resonant section 3—5 of filter FL3 and resistor R31. The shunt resistance of resistor R31 has been selected to give the desired ratio of the voltage developed by the frequency of the supervisory signals present to the voltage developed by the frequencies other than the supervisory signal frequencies present. The two voltages are then rectified and integrated within the network Z2 preparatory to application to the grid of the direct-current amplifier double-triode vacuum tube V3A and V3B.

It will now be assumed that 2600-cycle supervisory signal tone is being applied from the output of amplifier Z1 to the input of filter FL3. The path taken by the 2600-cycle supervisory signals may be traced from the top terminal of the output of amplifier Z1 to terminal 4 of diode network Z2, through rectifier VR1, which will pass the signals when they are positive, and then through resistor R50 through terminal 6 and contact 3 of relay K2, which is released, to the bottom terminal of the output of amplifier Z1. A circuit may be traced from negative biasing voltage BIAS V through resistors R51, R50, terminal 12 and resistor R54 to the grid of triode V3A. Another circuit may be traced from terminal 12 through potentiometer OT–P, comprising resistor R28 and its associated movable contact, and resistor R52 to the grid of triode V3B. The cathode of triode V3A is connected directly to ground; that of V3B through resistor R5. The biasing voltage may be, for instance, nine volts negative. Neglecting for the moment the operation of relay K3 and certain timing refinements which will be described hereinafter, in response to the positive voltage produced by the rectified 2600-cycle signaling current at terminal 12 of network Z2, triode V3B will be activated and a current will flow from positive battery through the winding of relay K4 and from the anode through the cathode of triode V3B and resistor R5 to ground, operating relay K4. When relay K4 is operated, its contact 1 is opened and its contact 2 is closed, as shown. When contact 1 of relay K4 is opened, relay K2 is deenergized and eventually releases as shown. With relay K2 released as shown, its contacts 1 and 2 are opened and its contact 3 is closed, as shown.

This is the condition which prevails while 2600-cycle supervisory signal tone is being received from the distant station. This will prevail during the idle period and until the circuit is conditioned for talking. When the circuit is conditioned for talking, 2600-cycle supervisory signal tone will be disconnected at the distant station. In response to this, the positive voltage resulting from the rectified 2600-cycle supervisory signal tone will be effectively disconnected. The nine-volt negative biasing potential will be unopposed. Triode V3B will be inactivated and relay K4 will release. When relay K4 releases, a circuit may be traced from negative battery through contact 1 of relay K4 and the winding of relay K2 to ground operating relay K2. Contact 2 of relay K2 is therefore closed and contact 3 is closed while the circuit is arranged to receive speech signals.

The circuit is arranged to discriminate between real speech frequency signals and components in the speech signals and other signals which tend to simulate the 2600-cycle supervisory signals to which relay K4 is intended to be responsive and to prevent its response to such signals while the circuit is arranged for talking. How this is performed will now be described.

When relay K2 is operated, which as explained in the foregoing is its condition while the circuit is arranged for talking, the voltage produced by signals of a frequency other than 2600 cycles is applied to the input of triodes V3A and V3B in such a manner that it opposes the voltage produced by signals in the speech currents which simulate the 2600-cycle supervisory signals. The signals of a frequency other than the 2600-cycle supervisory signals take a path which may be traced from the bottom terminal of the output of amplifier Z1 through terminal 8 of network Z2, diode rectifier VR2, which passes the negative half-cycles, resistor R51, terminal 6 of network Z2, contact 2 of operated relay K2 and through network 1—2—4 of filter FL3 which is antiresonant to 2600-cycle frequencies and passes other frequencies, to the top terminal of the output of amplifier Z1.

The path taken by any 2600-cycle signals which may be present during the time the circuit is arranged to receive speech signals may be traced from the top terminal of the output of the amplifier Z1, through terminal 4 of network Z2, diode rectifier VR1, which passes the positive half-cycles, resistor R50, terminal 6 of network Z2 through section 3—5 of filter FL3, which is resonant to 2600 cycles, to the lower terminal of the output of amplifier Z1.

It will be observed that in the case of the potentials produced across the resistor components of the input circuit of triodes V3A and V3B, the potential produced by the rectified current of frequencies other than 2600-cycle supervisory signal frequency is negative, aiding the negative nine-volt biasing frequency. The potential produced by the current of 2600-cycle frequency is positive.

Resistor R31 is connected in shunt across terminals 8 and 6 of network Z2. The magnitude of resistor R31 is selected to give the desired ratio of the voltage developed by the supervisory signal frequency to the voltage developed by other frequencies. When relay K2 is operated, resistor R30 is shunted to obtain a high degree of selectivity. Relay K2 therefore functions to change the selectivity of the circuits controlling triodes V3A and V3B.

Each of the diode rectifier circuits traced in the foregoing is shunted by an individual capacitor. Resistor R50 is shunted by capacitor C25 and resistor R51 is shunted by capacitor C26. Each capacitor serves as a storage circuit for its associated rectifier. These storage circuits have different discharge time constants. The discharge time constant for capacitor C25 and resistor R50 may be, for instance, five milliseconds. This is associated with the signals having a frequency corresponding to that of the supervisory signaling current. The discharge time constant for signals having a frequency other than that of the 2600-cycle supervisory signal current, which circuit comprises capacitor C26 and resistor R51, may be, for instance, 50 milliseconds. This is ten times longer than the other. Resistor R51 and capacitor C26, associated with the circuit through which the frequencies of the other than supervisory signal frequency are directed, are called a guard circuit as their function is to guard against false operation of relays K3 and K4 and the transmission of a false disconnect supervisory signal while the circuit is arranged for speech. The object of the guard circuit and the differing discharge times is to minimize the probability of false operation of the receiver by a cumulative build-up of rectified signal voltage due to a succession of short speech intervals having large amounts of the same frequency as the supervisory signal frequency.

It is necessary now to describe the manner in which the filter FL2 is inserted in the receiving speech path per se. Furthermore, it is necessary to describe certain refinements, notably a time sequence circuit for controlling the times of operation of the various relays. In order to facilitate this, a second direct-current amplifier, amplifier V3A, is included in the circuit together with a relay K3 controlled by the output circuit of amplifier V3A.

A circuit has been traced from terminal 12 of network Z2 through resistor R54 to the grid of triode V3A. The grid of triode V3A is driven directly by the voltage at terminal 12 without appreciable delay. The circuit to the grid of triode V3B has been heretofore traced. Although the grid of triode V3B is driven also by the voltage at terminal 12, its grid circuit includes a resistor-capacitor time delay circuit of substantial amount. The nominal time delay between terminals 12 and 10 of network Z2 is less than one millisecond, the resistor R54 and the capacitor C30 serve merely to attenuate rectifier ripple voltage. The nominal time delay between terminals 12 and 1 in the grid circuit of triode V3B is adjustable between 20 and 100 milliseconds by means of potentiometer OT–P. The potentiometer OT–P is adjusted, when the circuit in Fig. 1 is assembled, at nominal input signal level, −14 decibels referred to one milliwatt, to operate on a 60-millisecond pulse and not to operate on a 55-millisecond pulse.

The network Z2 is provided with an arrangement to prevent the build-up of voltage due to the effect of 2600-cycle frequencies in the speech currents which would tend to falsely operate relay K3 or K4. This is performed by providing for a rapid decay of the voltage developed across capacitance CN. This rapid decay is effected by the connection of the thallium-copper oxide rectifier VR3 between terminals 12 and 3 and the relatively low resistor-capacitance time constant of the network Z2 between terminals 12 and 6. This is an important feature of the invention and contributes to the effectiveness of the supervisory signal received to withstand exposure to supervisory signal frequencies in the speech voltages without false operation.

Since the present supervisory signal receiver has an appreciable difference in the rates of supervisory signal voltage increases and decay, it would introduce a distortion bias in signal repetition if it did not include an arrangement to prevent it. This is effected by the introduction of means for adjustably controlling the time of release of relay K4. The K4 relay, by virtue of the supervisory versus speech signal discriminating arrangement, described in the foregoing, operates only when actual supervisory signal tone is received. Compensation for the time required to operate the relay K4 is achieved by introducing a delay in the release of relay K4 equal to the nominal operate time of the relay. The release time of relay K4 is adjusted when the circuit is assembled to equal its operate time by means of potentiometer RT–P comprising resistors R24, R25 and the associated movable contact.

The adjustable release time of relay K4 is obtained by taking advantage of the sequence of operation and release of relay K3 and relay K4 to connect a charged capacitor C7 to the grid of triode V3B through resistor R53 of network Z2. Capacitor C7 is charged as follows:

Let it be assumed that supervisory signaling tone has been removed from the circuit long enough to have released relay K3 and relay K4. It will be assumed that this interval is 0.5 second. Capacitor C7 is practically completely discharged through resistor R27 since resistor R27 and capacitor C7, it will be assumed, have a time constant of approximately 120 milliseconds. Upon the arrival of a supervisory signaling tone spurt, relay K3, the winding of which is connected in the path between positive battery and the plate of triode V3A, operates within 20 milliseconds and transfers one side of capacitor C7 from terminal 9 of network Z2 to the slider of potentiometer RT–P. Resistors R24 and R25 are connected in series between positive battery and ground. A positive potential is therefore applied through terminal 3 of relay K3 to the left-hand terminal of capacitor C7. The right-hand terminal of capacitor C7 is connected to open contact 2 of relay K4, since relay K4 has not yet operated. The circuit is arranged so that approximately 45 milliseconds, for instance, after relay K3 operates, relay K4 operates to connect the right-hand terminal of capacitor C7 to negative battery. Capacitor C7 is thereupon charged within 15 milliseconds, for instance, to 67 percent of the sum of the —50 volt negative voltage and the positive voltage applied by the slider of potentiometer RT–P. The charging interval is terminated by the release of relay K3 within 20 milliseconds, for instance, upon removal of supervisory signal tone at the end of the signal spurt. A minimum expected 70-milliseconds tone pulse will therefore provide a sufficient charging interval for capacitor C7 to reach a nearly ultimate value of voltage. Upon release of relay K3 the charge on capacitor C7 is applied through resistor R53 to the grid of triode V3B. Thus, triode V3B is held conducting for some time after the rectified signal voltage has decayed below the operating point. Since potentiometer RT–P controls the magnitude of the total charge upon capacitor C7, it also controls the release time of relay K4 by virtue of its effect upon the duration of plate current conduction in triode V3B. Eventually, release of relay K4 returns grid voltage control of triode V3B to the signal rectifier.

Relay K3, as mentioned in the foregoing, controls the insertion or non-insertion of filter FL2 in the speech signal receiving path of the circuit. Whenever supervisory signal tone is being received, relay K3 will be operated closing its associated contact 2. The operation of relay K3 by opening its contact 1 disconnects the shunt around filter FL2 in the speech signal path and inserts resonant network 3—5 in series with antiresonant network 1—2—4 in the speech receiving path. This, as previously explained, prevents the passage of supervisory signaling tones, actually transmitted from the distant station, into the speech receiving portion of the circuit. Thus, supervisory signaling tone is blocked and prevented from appearing at the hybrid coil T3. This prevents its passage to the next tandem trunk section. It also prevents its transmission back towards the source of tone at the distant station from which the tone is being transmitted. The use of filter FL2 rather than cutting the transmission path through the speech reception portion of the circuit permits the reception of speech signals simultaneously with the reception of supervisory signal tone even though the transmission of supervisory signal tone through the speech portion of the circuit is effectively blocked. This is a requirement of straightforward signaling wherein intermediate switching points in a tandem connection, comprising a number of line sections, continue to send an on-hook signal to the originating end during the period while the connection is being established by information passed verbally over the circuit and until the called subscriber answers.

As heretofore explained, relay K2 is held operated by the closure of contact 1 of relay K4 during the talking interval or whenever supervisory signal tone is removed from the receiver. When relay K4 is released, a circuit is established from negative battery through contact 1 of relay K4, resistor R29 and capacitor C8 to ground charging capacitor C8. When supervisory signal tone is reapplied relay K4 operates opening the path to relay K2 which releases approximately 200 milliseconds later, for instance. The slow release feature is due to the discharge of the energy stored in capacitor C8 through resistor R29 and the winding of relay K2. Thus, 0.2 second after supervisory signal tone is applied, the selectivity of the supervisory signal tone receiver is changed to the condition wherein it no longer affords protection against frequencies in the supervisory signals which tend to simulate supervisory signal frequencies but provides reliable contact closure of K4 relay contacts despite noise bursts or momentary signal lead changes.

Relay K2 when operated also substitutes compensating load resistor R39 for the plate current normally flowing through relays K3 and K4. The object of this is to improve the voltage regulation of the positive plate voltage supply. The circuit for this may be traced from positive battery through resistor R39 and contact 1 of relay K2 to ground.

What is claimed is:

1. In a telephone communication system, a supervisory signal converter having means therein for converting a direct-current supervisory signal incoming to said converter into an alternating-current supervisory signal outgoing from said converter, a speech signal input branch and a supervisory signal input branch both connected to a common output branch for said speech signals and said supervisory signals all in said converter, means responsive to the reception of a direct-current supervisory signal by said converter for applying alternating signal current as a supervisory signal to said supervisory signal branch, and other means responsive to the reception of said direct-current supervisory signal by said converter for simultaneously increasing the impedance of said speech signal input branch so as to increase the amplitude of the transmitted alternating-current supervisory signal, said other means comprising a space discharge device biased to cut off.

2. In a telephone communication system, a converter for converting a direct-current supervisory signal into an alternating-current supervisory signal, a speech current input path in said converter, an alternating-current supervisory signal input path in said converter, a common output transmission path in said converter connected to said input paths for transmitting said speech signals and said supervisory signals, a direct-current supervisory signal input path in said converter, means, connected to direct-current input path, responsive to the reception of a direct-current supervisory signal for applying said alternating-current supervisory signal through its respective path to said common output path and other means in said converter responsive to the reception of said direct-current signal for simultaneously increasing the impedance of said speech input path so as to increase the amplitude of said alternating-current supervisory signals, said other means comprising a space discharge device in said speech input path and a gating circuit therefor.

3. In combination in a telephone communication circuit, a supervisory signal converter comprising means including a relay at a first station for converting an incoming direct-current supervisory signal into an outgoing alternating-current supervisory signal, a speech input circuit in said telephone communication circuit, other means including a space discharge device and a gating circuit therefor, responsive to said relay for simultaneously increasing the impedance of said speech input circuit in said converter, means responsive to said increase for increasing the amplitude of said alternating-current supervisory signal, a filter in said converter, said filter having means to suppress reflections of said alternating-current supervisory signal, and means for controlling said filter by said relay.

4. In a telephone communication system, a first station connectable to a second station, a converter at said first station having means therein for converting direct-current supervisory signals into alternating-current supervisory signals of a first frequency, a transmitting branch and a receiving branch in said converter, means in said transmitting branch for transmitting both speech signals and said signals of said first frequency from said first station toward said second station, a section in said receiving branch having means for receiving from said second station both speech signals and alternating-current supervisory signals of a second frequency different from said first frequency, a first individual speech receiving branch and a second individual alternating-current supervisory signal receiving branch in said converter both connected to said section, a first band filter effectively connectable in said section for suppressing alternating current of said first frequency reflected from said second station, a second band filter effectively connectable in said first branch for suppressing signals of said second frequency, means at said first station for transmitting a direct-current supervisory signal into said converter, first switching means responsive thereto for impressing signals of said first frequency on said transmitting branch, second switching means in said converter responsive to the reception of said direct-current supervisory signals for simultaneously effectively connecting said first band filter in said section and other means in said second branch responsive to the reception of supervisory signals of said second frequency for effectively connecting said second filter in said first branch, to prevent the transmission of alternating-current supervisory signals of said second frequency through said first branch.

5. A system in accordance with claim 3 having means connected to said second branch for reconverting said signals of said second frequency into direct-current supervisory signals, means including a delay circuit for sensing said signals of said second frequency for a first interval before said reconversion to discriminate against spurious signals simulating supervisory signals and means including a pair of triodes responsive to alternating-current signals incoming to said second branch and a charge and discharge circuit responsive to said triodes for protracting said direct-current supervisory signal for an interval equal to said first interval to compensate for said delay.

6. In a communication system, a potential controlled supervisory signal converter having means therein for receiving alternating-current supervisory signals and converting them into direct-current supervisory signals, means in said converter for discriminating against alternating-current frequencies in the speech band simulating the supervisory signals during the reception of speech signals, said means comprising a filter having means for separating the frequency corresponding to the supervisory signal frequency from other frequencies in the speech band, a first and a second potential producing means responsive to said corresponding frequency and to said other frequencies, respectively, a first and a second capacitor-resistor charging circuit having substantially different time constants responsive to the individual potentials produced in said first and second potential producing means and a low-resistance discharge circuit connected to said charging circuit which is responsive to said corresponding frequency, to prevent the build-up of potential due to the reception of spurious supervisory signals.

No references cited.